(No Model.) 2 Sheets—Sheet 1.
W. T. WRIGHT.
BAND CUTTER AND FEEDER.
No. 532,623. Patented Jan. 15, 1895.
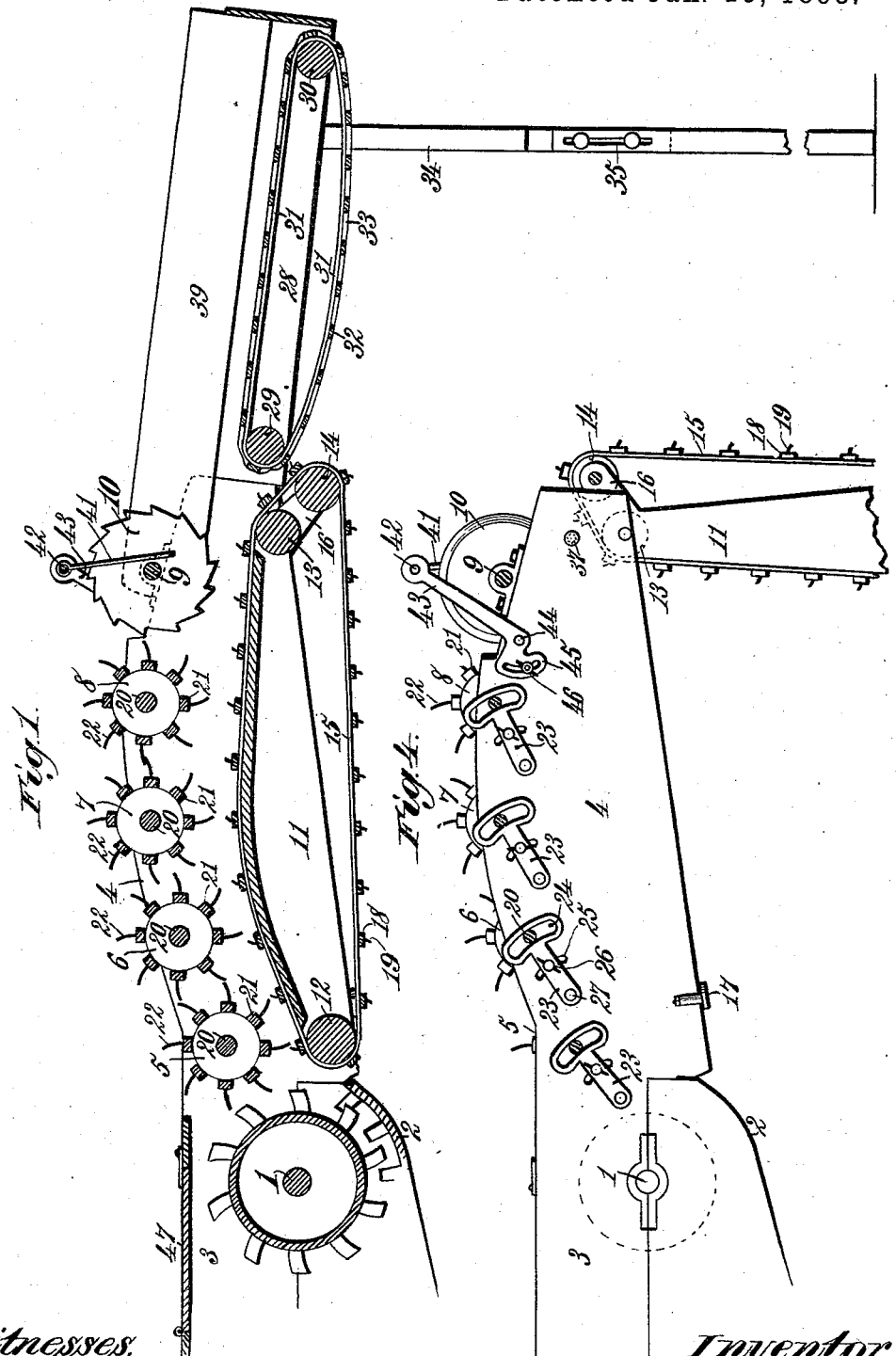
Witnesses
Robert Corritt
G. W. Rea
Inventor
Wallace T. Wright.
By James L. Norris.
Atty.

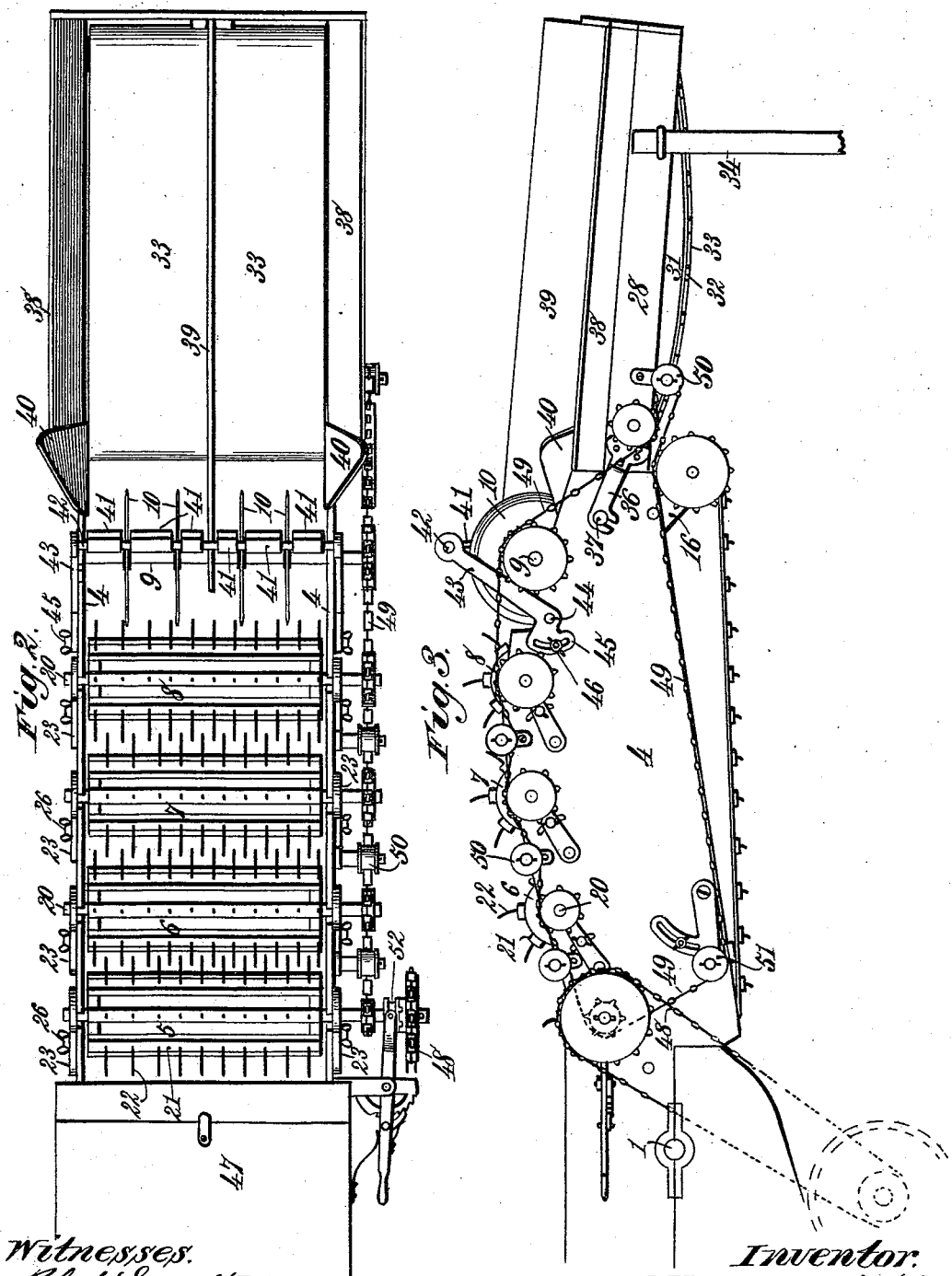

UNITED STATES PATENT OFFICE.

WALLACE T. WRIGHT, OF URSA, ILLINOIS, ASSIGNOR, BY DIRECT AND MESNE ASSIGNMENTS, OF TWO-FIFTHS TO JASPER N. WOODRUFF, FRED. C. FLACK, WILLIAM E. WRIGHT, AND ALONZO A. SMALLWOOD, OF SAME PLACE.

BAND-CUTTER AND FEEDER.

SPECIFICATION forming part of Letters Patent No. 532,623, dated January 15, 1895.

Application filed May 10, 1894. Serial No. 510,777. (No model.)

*To all whom it may concern:*

Be it known that I, WALLACE T. WRIGHT, a citizen of the United States, residing at Ursa, in the county of Adams and State of Illinois, have invented new and useful Improvements in Band-Cutters and Feeders, of which the following is a specification.

This invention relates to band cutters and feeders for thrashing machines, and consists in the features of construction and novel combinations of devices as hereinafter described and claimed.

In the annexed drawings illustrating the invention, Figure 1 is a vertical longitudinal section of my improved feeding and band cutting apparatus for thrashing machines. Fig. 2 is a plan of the same. Fig. 3 is a side elevation of the machine, showing an arrangement of sprocket gearing for driving the rake cylinders and endless carriers at proper relative rates of speed. Fig. 4 is a side elevation of the main portion of the machine, with the tender removed and showing the frame of the traveling toothed carrier swung downward to afford ready access to the thrashing cylinder and concave.

Referring to the drawings, the numeral 1 designates an ordinary thrashing cylinder and 2 the concave. Extended in a forward and upward direction from the sides of the cylinder chamber 3 is a frame 4 in which a number of revolving rake cylinders 5, 6, 7 and 8 are mounted at convenient intervals. On a rotary shaft 9 in advance of the front rake cylinder 8 are mounted a series of band cutters 10 the edges of which may be either plain or serrated, as preferred.

To the lower front portion of the stationary frame 4 is hinged a downwardly swinging frame 11, Fig. 4, in which are mounted the rollers 12, 13 and 14 for supporting an endless traveling carrier 15 that is adapted to serve as the bottom of the stationary frame 4 and form a traveling bed beneath the series of revolving rake cylinders. The roller 12 is journaled in the rear end of the swinging frame 11 and the rollers 13 and 14 are journaled in a downwardly and forwardly inclined offset 16 on the front end of said frame, one of said rollers being above and in rear of the other. By this arrangement of the rollers 13 and 14, the friction on the traveling carrier 15 is greatly diminished at its under side. The side pieces of the frame 11 are formed with convexed upper edges that serve as guides for the traveling carrier 15 in such manner as to carry the separated grain in proper proximity to the revolving rake cylinders and facilitate its entrance into the thrashing machine. When the hinged carrier frame 11 is in its raised or nearly horizontal position, as shown in Fig. 1, it may be secured by a latch 17, or other suitable fastening on each side.

The endless traveling carrier 15 consists of a number of belts connected by transverse bars 18 secured to the belts at close intervals. Each transverse bar 18, in this carrier, is provided with a series of teeth 19 sufficiently long to penetrate the under side of the body of grain and straw that is passing along to the thrasher. The teeth 19 may be slightly curved, as shown.

The revolving rake cylinders 5, 6, 7 and 8 each comprise a rotary shaft 20 to which are secured circular heads that are connected by transverse bars 21 each of which carries a series of curved teeth 22 of sufficient length to quite deeply penetrate the body of material on the endless toothed carrier. These revolving rake cylinders are each mounted in adjustable boxes 23 in such manner as to be capable of vertical adjustment and at the same time be permitted to rise and fall automatically with any variation in the thickness of the material acted on. For this purpose the boxes 23 are preferably in the form of arms that are pivoted to the sides of the machine frame 4 and each provided with a segmental slot 24 to receive the shaft 20 of a rake cylinder.

In the sides of the frame 4 are slots 25 to receive set screws 26 carried on the boxes 23 and through which they may be adjustably secured at any required elevation. At 27, Fig. 4, are shown the pivots on which the boxes 23 are supported, so that by loosening the set screws 26 in the slots 25 they may be adjusted to any required elevation to vary the positions of the rake cylinders, the shafts of which being loosely mounted in the slots 24 will permit them to rise and fall, independently of each other, with any variation in the thickness of the body of grain and straw.

It is my purpose to revolve the thrashing cylinder 1 and the several independent rake cylinders 5, 6, 7 and 8, in such manner that each rearmost cylinder will rotate at a faster rate of speed than those that first act on the grain. The thrashing cylinder 1 may be driven at, say, twelve hundred revolutions per minute. The rearmost rake cylinder 5 may be so geared with a driving pulley as to be driven therefrom at a less speed. The next rake cylinder 6 will be driven from the rear one at a still less speed and so on to the forward rake cylinder 8 which has the lowest speed. Any suitable belt or chain gearing may be employed for this purpose, with pulleys or sprocket wheels of proper diameter on the shafts of the cylinders to give the desired rate of speed for each.

The shafts of the thrashing cylinder 1 and rear rake cylinder 5 may be provided with cone pulleys or other variable gear for changing their relative rate of speed, if desired; and any suitable clutch mechanism may be employed to permit throwing the rake cylinders out of action without interfering with the operation of the thrashing machine.

The traveling toothed carrier 15 is to be driven at less speed than the series of rake cylinders so that while the several rake cylinders will successively hasten onward the upper portion of the grain and straw the toothed carrier 15 will retard the progress of the lower portion or under side of the material. By this conjoint action of the revolving rake cylinders and traveling toothed carrier the straw is thoroughly separated and spread apart and is fed evenly to the thrashing machine without liability of choking the machine at any point. The successive acceleration of speed imparted to the revolving rake cylinders, from front to rear of the machine, causes them to continuously and rapidly draw off the straw from the top and keeps it from winding about the cylinders. The long teeth 22, with which the rake cylinders are provided, are adapted to penetrate the body of straw to such distance as to effect its thorough loosening and separation and cause it to be drawn off rapidly and without any downward pressure of the cylinder bars 21 onto the body of straw which would tend to retard its loosening apart and separation.

The band cutters 10 and the traveling toothed carrier 15 may be driven by any suitable gearing, either from the revolving rake cylinders or directly from a driving shaft. By imparting a very low rate of speed to the traveling toothed carrier 15 and furnishing it with teeth that will take a firm grip in the under side of the body of grain and straw, the revolving rake cylinders will be materially aided in the proper separation and spreading apart of the material.

To the forward end of the feeder frame 4 is detachably connected a tender or supplemental frame 28 having rollers 29 and 30 mounted transversely in its opposite ends. These rollers support an endless traveling carrier 31 composed of a number of belts connected by transverse slats or bars 32 covered by a continuous or endless web 33 of heavy smooth surfaced canvas.

The supplemental feeder frame 28 may have legs 34 provided with splice joints 35 to vary their length, as required. At its rear end the frame 28 is provided on each side with latching arms 36 to engage pins or lugs 37 on the frame 4 and thus detachably hold the two frames in proper alignment with each other. The tender or supplemental feed frame 28 is provided, above the carrier 31 with wide outwardly flaring sides 38 to confine the sheaves or grain bundles and hold them in place on the traveling canvas carrier. Above the center of the carrier 31 is placed a wide longitudinally arranged partition 39 that is extended rearward to a point between the band cutters 10 on the shaft 9, which shaft, if desired, may be passed through the rear end of said partition. This partition 39 permits the placing of two grain bundles, side by side, on the traveling carrier 31 and separated by the partition which prevents them from getting crosswise. At the rear end of the frame 28, on each side of the partition 39, is a fender 40 to turn inward any straggling grain.

In order to prevent one bundle of grain from passing along on top of another adjustable stop plates or cut-offs 41 are suspended in front of the band cutter shaft 9, between the rotary cutters 10 mounted thereon. These stop plates 41 are pivotally suspended at their upper ends from a rod 42 carried in the upper and forwardly projecting ends of inclined bars 43 that are connected by pivots 44 to the sides of the frame 4 and provided at their lower ends with slotted projections 45 for passage of thumb-screws or bolts 46, by which the said bars 43 may be adjusted in such position that the stop plates 41 will hang in front of the shaft 9 and between the band cutters. The cut-off or stop plates 41 will act to prevent the grain, thrown onto the carrier 31, from being crowded into the machine too fast, and also serve to prevent any winding of straw onto the band cutter shaft. It is obvious that a little resistance from the stop plates or cut-off will temporarily arrest the progress of any superabundant quantity of grain, and in such manner as not to obstruct the proper action of the traveling carrier 31, as the smooth canvas cover of said carrier will enable it to slip readily under the bundle of grain until the space ahead is clear. Thus, by means of the adjustable cut-off or stop plates and canvas covered carrier the supply of grain to the feeder is readily and automatically regulated. The rollers of both endless carriers 15 and 31 may be made of wood but are preferably covered with leather at their points of contact with the carrier belts.

It will be observed that this machine is designed to feed two sheaves side by side and spread apart the separated material throughout the entire width of the machine so that it will be subjected to the most effective action of the thrashing cylinder and with no liability of choking or crowding at any point. On the canvas carrier 31 of the supplemental feed frame the sheaves are kept apart by the longitudinal partition 39 and prevented from moving crosswise, while the high flaring sides 38 also assist in holding them in place and the fenders 40 take care of any straggling grain. Should there be any tendency to crowding, owing to a too great thickness of grain or too large supply, the cut-off or stop plates 41 will check the movement of the upper part of the grain while the toothed carrier will carry along the under part and clear the way for the advance of the sheaf; the smooth canvas carrier, in the meanwhile, slipping along under the bundles of grain without exerting any positive action on them until the way has been cleared by the toothed carrier and revolving rake cylinders. After passing the band cutters 10 the top portion of the grain is drawn off and hastened on at a gradually accelerating speed by the series of revolving rake cylinders. While the teeth of these rake cylinders pull one way on or in the upper portion of the grain the slowly traveling toothed carrier 15 pulls the other way, on the under side of the material; and thus the mass of material is thoroughly loosened or separated and spread apart. Therefore, the grain passes to the thrasher in a continuous stream throughout the full width of the machine and without any tendency to bunch up between the cylinders. The action of the revolving rake cylinders is smooth and regular and with no dashing of the cylinder bars against the grain; for the less the grain is pressed the more easily it may be separated. The retarding action of the slowly moving toothed carrier 15, in connection with the series of revolving rakes running successively at increased speeds, is especially useful in the handling of grain that is stacked and hard to separate.

The cylinder chamber 3 may be provided with a hinged lid 47 to give access to the thrashing cylinder.

When the machine is not in use the supplemental feed frame or tender 28 may be readily detached.

All the parts of the machine are easily accessible and of such character that they are not liable to become broken or disarranged.

In Figs. 2 and 3 I have shown the rearmost rake cylinder provided with sprocket gearing 48 through which it is revolved from a driving shaft located below the thrashing cylinder or at some other convenient point. The shaft of the rear rake cylinder 5 is shown as provided with a small sprocket gear for engagement with a driving chain 49 that also engages successively larger sprocket wheels on the shafts of the rake cylinders 6, 7, 8, the band cutter shaft 9 and the shaft of the driving roller 14 through which the endless toothed carrier 15 is actuated. The chain 49 also drives the endless canvas covered carrier 31 through a sprocket wheel on the shaft of the roller 29, suitable pulleys 50 being arranged at appropriate points to give proper direction to the chain 49 and cause it to engage the several sprocket wheels in such manner as to actuate the rake cylinders, band cutters and endless carriers in the proper directions and with the required differences in speed. An adjustably mounted tightening pulley 51, for the chain 49, may also be provided. A clutch mechanism 52 may be arranged on the shaft of the rake cylinder 5 for throwing the feeder out of action when desired.

Although I have thus shown an arrangement of sprocket gearing for driving the band cutting and feeding devices it is obvious that they may be actuated at proper relative speeds through other forms of gearing.

What I claim as my invention is—

1. The combination with a thrashing cylinder and concave, of a series of revolving rake cylinders mounted in front of the thrashing cylinder and successively geared to revolve at less speed than the thrashing cylinder and those rake cylinders nearest to it, a band cutter in front of the rake cylinders, and a slowly traveling toothed carrier mounted in a hinged frame below the revolving rake cylinders and band cutter and adapted to be swung downward to give access to the thrashing cylinder and concave, substantially as described.

2. The combination with a thrashing cylinder and concave, of a series of revolving rake cylinders mounted in front of the thrashing cylinder and independent of each other in a series of vertically adjustable arms or boxes each of which is provided with a slot to receive the shaft of a rake cylinder and permit it to rise and fall automatically, a band cutter in front of the rake cylinders, and a slowly moving toothed carrier arranged to form a continuous bed below the rake cylinders and band cutter and exert a retarding action on the under side of the grain while the upper side is drawn off rapidly by the revolving rake cylinders, substantially as described.

3. The combination with a thrashing cylinder and concave and a stationary frame projecting from the front of the cylinder chamber, of a series of revolving rake cylinders mounted in said frame and successively geared to revolve at less speed than the thrashing cylinder and those rake cylinders nearest to it, a band cutter in front of the rake cylinders, a carrier frame hinged to the front end of the stationary frame and provided with a downward and forwardly inclined offset at its front end, a pair of rollers mounted in the front offset portion of the hinged carrier frame and a single roller mounted in the rear end of said frame, a slowly traveling toothed carrier mounted on said rollers, and means for fastening the hinged carrier frame in a horizontal position below the rake cylinders, the sides of said frame having convexed upper edges to serve as guides for the traveling toothed carrier, substantially as described.

4. The combination with a thrashing cylinder and concave, of a series of revolving rake cylinders mounted in front of the thrashing cylinder and successively geared to revolve at less speed than the thrashing cylinder and those rake cylinders nearest to it, a band cutter in front of the rake cylinders, a slowly traveling toothed carrier arranged to form a bed below the rake cylinders and band cutter and adapted to exert a retarding action on the under side of the grain while the rake cylinders gradually draw off the top of the grain at a successively increasing rate of speed, a traveling canvas covered carrier in front of the toothed carrier, and an adjustable stop plate or cut-off in front of the band cutter to act with the canvas carrier in regulating the feed, substantially as described.

5. The combination with a thrashing cylinder and concave, and a series of a revolving rake cylinders and a band cutter mounted in a stationary frame in front of the thrashing cylinder, of a slowly moving toothed carrier below the rake cylinders and band cutter, an adjustable stop plate or cut-off in front of the band cutter shaft, a supplemental frame or tender detachably connected with the front of the stationary frame and provided with flaring sides and a longitudinal partition, a traveling canvas carrier mounted in the bottom of the supplemental frame, and fenders on each side of the partition in said frame, substantially as described.

In testimony whereof I have hereunto set my hand and affixed my seal in presence of two subscribing witnesses.

WALLACE T. WRIGHT. [L. S.]

Witnesses:
G. M. STONE,
A. A. SMALLWOOD.